(12) United States Patent
Adeel et al.

(10) Patent No.: US 12,093,125 B2
(45) Date of Patent: Sep. 17, 2024

(54) SERVER-SIDE REMEDIATION FOR INCOMING SENSOR DATA

(71) Applicants: Getac Technology Corporation, New Taipei (TW); WHP Workflow Solutions, Inc., North Charleston, SC (US)

(72) Inventors: Muhammad Adeel, Edina, MN (US); Thomas Guzik, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 37 days.

(21) Appl. No.: 17/944,791

(22) Filed: Sep. 14, 2022

(65) Prior Publication Data

US 2024/0086274 A1    Mar. 14, 2024

(51) Int. Cl.
*G06F 11/07* (2006.01)
*G06F 11/00* (2006.01)
*H03M 13/00* (2006.01)

(52) U.S. Cl.
CPC ...... *G06F 11/0793* (2013.01); *G06F 11/0721* (2013.01)

(58) Field of Classification Search
CPC .............. G06F 11/0793; G06F 11/0721
See application file for complete search history.

(56) References Cited

U.S. PATENT DOCUMENTS

| 10,592,821 B2* | 3/2020 | Denton ................... F24F 11/63 |
| 10,719,388 B2 | 7/2020 | Reynolds |
| 10,845,079 B1* | 11/2020 | Picardi .................... F24F 11/64 |
| 11,143,752 B2* | 10/2021 | Campbell ............... G01S 11/06 |
| 11,174,721 B2* | 11/2021 | Brookes .................. H04Q 9/02 |
| 11,294,070 B2* | 4/2022 | Heinonen ............... G01S 19/07 |
| 11,429,475 B1 | 8/2022 | Griffin et al. |
| 2011/0185262 A1 | 7/2011 | Kershaw et al. |
| 2017/0242761 A1 | 1/2017 | Ruiz et al. |
| 2017/0109794 A1* | 4/2017 | Smith ............... G06Q 30/0277 |
| 2021/0041546 A1* | 2/2021 | Campbell ............... G01S 11/06 |
| 2022/0012120 A1 | 1/2022 | Safary et al. |

(Continued)

OTHER PUBLICATIONS

International Application No. PCT/2023/029703, International Search Report and Written Opinion mailed Dec. 5, 2023, 9 pages.

*Primary Examiner* — Justin R Knapp
(74) *Attorney, Agent, or Firm* — Finnegan, Henderson Farabow, Garrett & Dunner, L.L.P.

(57) ABSTRACT

Incoming sensor data from a data collection device may be received at the data processing platform that includes the plurality of data processing microservices. A data processing microservice of the data processing platform may detect that the incoming sensor data from the data collection device caused an error. As a result, the incoming sensor data may be queued in a faulty data cache of the data processing platform. Subsequently, at least one of the data processing microservice or the incoming sensor data stored in the faulty data cache may be modified such that the incoming sensor data is processed by the data processing microservice without the error. Following the processing, the incoming sensor data may be deleted from the faulty data queue of the data processing platform.

20 Claims, 8 Drawing Sheets

(56) References Cited

U.S. PATENT DOCUMENTS

| | | | | |
|---|---|---|---|---|
| 2022/0133153 A1* | 5/2022 | Lee | ............... | A61B 5/6824 |
| | | | | 600/549 |
| 2022/0155487 A1* | 5/2022 | Jahn | ............... | G01W 1/14 |
| 2022/0360538 A1* | 11/2022 | Xie | ............... | H04L 49/90 |
| 2023/0213946 A1* | 7/2023 | Wyatt | ............... | G05D 1/0274 |
| | | | | 700/245 |
| 2023/0298401 A1* | 9/2023 | Fang | ............... | H04L 67/125 |
| | | | | 709/217 |

\* cited by examiner

SERVER-SIDE REMEDIATION FOR INCOMING SENSOR DATA

BACKGROUND

Law enforcement officers generally carry multiple body-worn electronic devices as they perform their law enforcement functions. For example, law enforcement agencies are increasingly mandating that their law enforcement officers carry and use portable recording devices to record audiovisual recordings of their interactions with the public. The recordings may serve to protect the public from improper policing, as well as protect law enforcement officers from false allegations of police misconduct. Other body-worn electronic devices may include a portable communication device, a smartphone that enables the law enforcement officer to look up online information, one or more devices that monitor the health indicia of the law enforcement officer, devices that monitor whether a firearm of the holstered or unholstered, and/or so forth. These electronic devices may regularly upload the sensor data they collect to a centralized data processing platform so that the sensor data may be processed, correlated, and stored for future viewing, auditing, and/or used for evidentiary purposes.

However, in some instances, these electronic devices may experience errors during the upload of the collected sensor data to the centralized data processing platform. For example, the centralized data processing platform may receive unrecognizable or incomplete sensor data from an electronic device of a law enforcement officer that the platform is unable to process. Such an error may cause the electronic device to freeze or become otherwise unable to perform its routine sensor data collection tasks due to the error. As a result, the law enforcement officer may be required to immediately return to a station house or central support facility so that the sensor data collected by the electronic device may be manually downloaded. In some instances, the electronic device that is experiencing the error may also need to be manually reset and/or the error cleared by an authorized service person. The return of the law enforcement officer to the station house or facility to resolve the error experienced by the electronic device may result in the officer being unable to perform law enforcement duties for an extended period of time.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
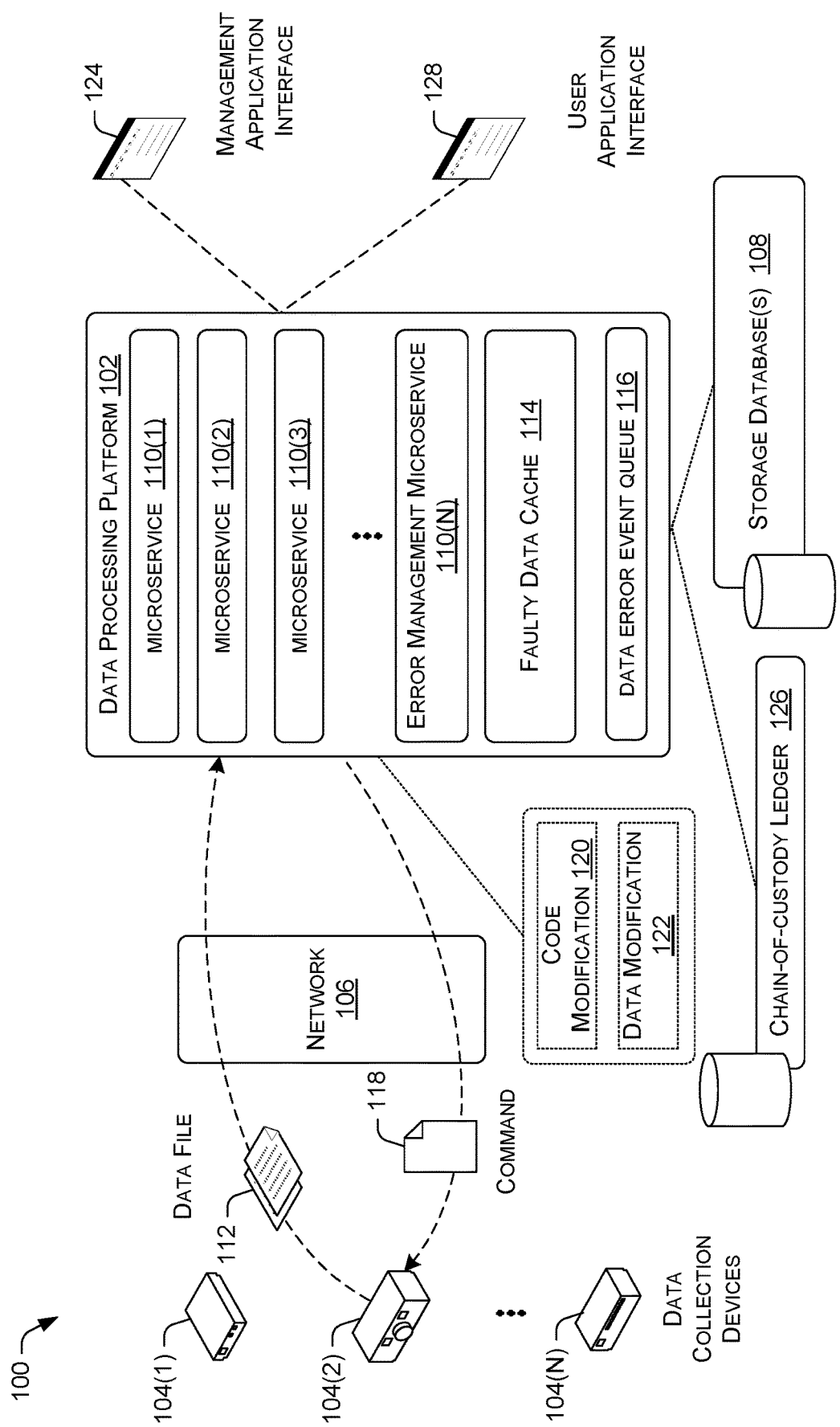
FIG. 1 illustrates an example environment that supports server-side remediation for incoming sensor data received from multiple data collection devices.

This disclosure is directed to techniques for performing server-side remediation with respect to sensor data that are received from multiple data collection devices. The server-side remediation may be performed by a data processing platform that receives data from the multiple data collection devices. The multiple data collection devices may include devices that collect sensor data related to users and their surroundings. For example, in a law enforcement context, the data collection devices may include multimedia cameras that are worn by individual law enforcement officers, often referred to as body cams, body-worn sensors that track geolocations (e.g., GPS coordinates), biometric readings (e.g., heart rate, blood pressure, etc.), other evidence gathering devices, such as digital tablets, in-vehicle or portable computers, standalone audiovisual recording equipment (portable audio/visual/multimedia recorders, surveillance UAVs or drones, concealed audio/video surveillance sensors, etc.), and/or so forth. The data collection devices may also include sensors that monitor the vehicles or other equipment used by the individual law enforcement officers. The vehicles may include cars, aircraft, boats, and/or so forth. For example, the sensors may include a gun sensor that monitors the time and date that a gun of a law enforcement officer is unholstered and/or fired. In another example, the sensors may include a multimedia camera mounted in a police vehicle, a vehicle sensor that tracks the geolocations of a police vehicle, the driving routes and associate travel/destination time and date of the vehicle, the vehicle health sensor readings of the vehicle, and/or so forth. The data processing platform may be configured to receive uploads of such sensor data from various devices. In turn, the data processing platform may be configured to process, correlate, analyze, store, and/or retrieve such sensor data for subsequent viewing, auditing, and/or evidentiary use. In various embodiments, the data processing platform may be a microservices platform that includes multiple microservices. Each of the microservices may be configured to perform a set of discreet tasks related to the processing, correlation, analysis, storage, and/or retrieval of the sensor data collected by the data collection devices.

In some embodiments, the microservices of the data processing platform may include an error management microservice that is able to detect that incoming sensor data from a data collection device caused an error at a data processing microservice of the platform. The error management microservice may queue the incoming sensor data in a faulty data cache. Subsequently, the error management microservice may generate a data error event entry in a data error event queue documenting the error associated with the incoming sensor data. The error management microservice may also be configured to determine whether the data collection device is locked up as a result of the error. For example, the error management microservice may determine that the device is locked up when the device is continuously retrying the sending of the incoming sensor data to the data processing platform. In response to determining that the data collection device is locked up, the error management microservice may send a command to the data collection device that directs the data collection device to resume a working operation state. In some instances, the resumption of the working operation state may free up the data collection device to collect additional sensor data for uploading to the platform.

Furthermore, the error management microservice may modify at least one of the data processing microservice or the incoming sensor data stored in the faulty data cache such that the data stored in the cache is subsequently processed by the data processing microservice without the error. Following the successful processing of the incoming sensor data by the data processing microservice, the error management microservice may remove the data error event entry from the data error event queue. The error management microservice may also delete the incoming sensor data from the faulty data cache. In embodiments in which the incoming sensor data is modified for processing by the data processing microservice, the error management microservice may further store data regarding the modification of the incoming sensor data in a chain-of-custody ledger.

In additional embodiments, the error management microservice may be configured to use a management application interface to provide data regarding the data processing errors that are experienced by the microservices of the data processing platform. Accordingly, the management application interface may be used by an administrator of the data processing platform to analyze the errors related to incoming sensor data and initiate modifications to the data processing microservices or incoming sensor data packets. In further embodiments, the error management microservice may be configured to provide users of the data processing platform with access to user application interfaces. The user application interfaces may be used by the users to view information related to any data processing errors associated with the data collection devices under the control of the users. For example, a user of the data processing platform may be a particular law enforcement agency. As such, authorized representatives of the law enforcement agency may use a user application interface to determine whether any of the agency's data collection devices as assigned to its law enforcement officers are impacted by data processing errors.

The use of an error management microservice platform by a data processing platform for performing server-side remediation of data processing errors may prevent such errors from locking up data collection devices and disable the collection of additional sensor data by the data collection devices. In the context of data collection devices used in the law enforcement context, such remediation of data processing errors on the server-side may ensure that data collection devices used by law enforcement officers continuously function to collect vital data that protect the health and safety of law enforcement officers, acquire evidentiary data that may be important to the deterrence and prevention of criminal activities, as well as ensure that the law enforcement officers who perform critical roles in safeguarding the public are not unnecessarily taken off duty due to software errors. Example implementations are provided below with reference to the following FIGS. 1-8.

Example Environment

FIG. 1 illustrates an example environment 100 that supports server-side remediation for incoming sensor data received from multiple data collection devices. The environment 100 may include a data processing platform 102 that receives data from the multiple data collection devices, such as the data collection devices 104(1)-104(N). In various embodiments, the data collection devices 104(1)-104(N) may periodically or continuously synchronize with the data processing platform 102 to upload sensor data to the platform via a network 106. The network 106 may include the Internet, a local area network (LAN), a wide area network (WAN), a cellular network, and/or some other network. The multiple data collection devices may include devices that collect sensor data related to users and their surroundings. For example, in a law enforcement context, the data collection devices may include multimedia cameras that are worn by individual law enforcement officers, often referred to as body cams, body-worn sensors that track geolocations, biometric readings (e.g., heart rate, blood pressure, etc.), other evidence gathering devices, such as digital tablets, in-vehicle or portable computers, standalone audiovisual recording equipment (portable audio/visual/multimedia recorders, surveillance UAVs or drones, concealed audio/video surveillance sensors, etc.), and/or so forth. The data collection devices may also include sensors that monitor the vehicles or other equipment used by the individual law enforcement officers. The vehicles may include cars, aircraft, boats, and/or so forth. For example, the sensors may include a gun sensor that monitors the time and date that a gun of a law enforcement officer is unholstered and/or fired. In another example, the sensors may include a multimedia camera mounted in a police vehicle, a vehicle sensor that tracks the geolocations of a police vehicle, the driving routes and associate travel/destination time and date of the vehicle, the vehicle health readings of the vehicle, and/or so forth.

The data processing platform 102 may be configured to receive uploads of such sensor data from the various devices. In turn, the data processing platform 102 may be configured to process, correlate, analyze, store, and/or retrieve such sensor data for subsequent viewing, auditing, and/or evidentiary use. For example, the data processing platform 102 may correlate two multimedia files that are captured by the body cams worn by two different law enforcement officers as capturing the same incident. In another instance, the data processing platform 102 may correlate the biometric readings of a law enforcement officer during a particular incident with a multimedia file that captured the movements of the officer during incident. In some cases, the data processing platform 102 may execute an object recognition function on the images in one or more multimedia files to determine whether a particular object is present in the one or more multimedia files. The data processing platform 102 may further store and retrieve data files that contain the sensor data from one or more storage databases 108 per various data operations and queries.

In various embodiments, the data processing platform 102 may be a microservices platform that includes multiple microservices, such as the microservices 110(1)-110(N). Each of the microservices 110(1)-110(N) may be configured to perform a set of discreet tasks related to the processing, correlation, analysis, storage, and/or retrieval of the sensor data collected by the data collection devices.

In some embodiments, the microservices 110(1)-110(N) of the data processing platform 102 may include an error management microservice 110(N) that is able to detect that incoming sensor data from a data collection device (e.g., data collection device 104(2)) caused an error at a data processing microservice (e.g., microservice 110(2)) of the platform. In some instances, the error management microservice 110(N) may detect the error when the microservice 110(N) receives a notification (e.g., an error code) from the data processing microservice indicating that a data file (e.g., a data file 112) containing incoming sensor data cannot be processed. The data file may contain one or more data packets of sensor data. In other instances, the error management microservice 110(N) may detect the error when the data processing microservice fails to generate an output within a predetermined amount of time following a receipt of the data file.

In response to the detection of the error, the error management microservice 110(N) may queue the data file of the incoming sensor data in a faulty data cache 114. Subsequently, the error management microservice 110(N) may generate a data error event entry in a data error event queue 116 documenting the error associated with the data file of the incoming sensor data. The data error event entry may include a data file identifier that identifies the corresponding data file stored in the faulty data cache 114, a microservice identifier of the data processing microservice that experienced the error, an error code associated with the error, a corresponding description of the error that is generated based on the error code, and/or so forth. For example, the error management microservice 110(N) may use an error code translation table database to retrieve a description of the error from the error code.

In some embodiments, the error management microservice 110(N) may be further configured to determine whether the data collection device is locked up as a result of the error. In such embodiments, the error management microservice 110(N) may determine that the data collection device is locked up when the device is continuously retrying the sending of the incoming sensor data to the data processing platform. For example, the data collection device may be repeatedly sending multiple data files with the same file identifier and/or time stamp to the platform due to the lack of an expected acknowledgment message from the data processing microservice. In response to determining that the data collection device is locked up, the error management microservice 110(N) may send a command (e.g., a command 118) to the data collection device that directs the data collection device to resume a working operation state. In some instances, the resumption of the working operation state may free up the data collection device to collect additional sensor data for uploading to the platform.

Furthermore, the error management microservice 110(N) may modify at least one of the data processing microservice or the incoming sensor data stored in the faulty data cache 114. The modification of the data processing microservice may include modification to the source code of the microservice. The code modification 120 may be performed using a code editing and/or application programming tool that is accessible via the error management microservice. The data processing errors may be caused by various problems. Some of these problems may include a large size of the data file causing the data processing microservice to time out during file transfer, the data file containing special characters that are not recognized as valid data values by the data processing microservice, programming errors that cause the data processing microservice to fail to properly parse the data packets included in the data file, and/or so forth. Thus, the error management microservice 110(N) may apply corresponding modifications to the code of the data processing microservice such that the sensor data stored in the faulty data cache 114 may be processed by the data processing microservice without the error.

In some embodiments, the error management microservice 110(N) may apply a code modification 120 that is manually inputted by an administrator of the data processing platform 102 to the data processing microservice. In such embodiments, the administrator may use a management application interface 124 to monitor the data error event queue 116. Upon noticing that data error event entry in the queue, the administrator may use various diagnostic tools to review the information included in the data error event entry, the corresponding data file stored in the faulty data cache 114, and/or the source code of the data processing microservice to determine the appropriate code modification 120 to make to the source code of the data processing microservice. For example, the application tools may include a data viewer, a data parser, a data integrity checker, a code editor, a code compiler/de-compiler, and/or so forth. Once the code modification 120 is made by the administrator into the underlying code of the data processing microservice via the code editing and/or application programming tool, the administrator may use the error management microservice 110(N) to direct the modified data processing microservice to reprocess the corresponding data file in the faulty data cache 114.

In other embodiments, the error management microservice 110(N) may automatically apply the code modification 120 to the data processing microservice to remedy the error. In such embodiments, the error management microservice 110(N) may be configured to use one or more logic algorithms (e.g., a decision tree algorithm, a pattern matching algorithm, and/or so forth) to review the information included in the data error event entry and/or the corresponding data file stored in the faulty data cache 114 to determine the specific code modification 120 to perform for the data processing microservice. Subsequently, the error management microservice 110(N) may use a script function to automatically activate the code editing and/or application programming tool to make the code modification 120 to the source code of the data processing microservice. Once the source code is modified, the error management microservice 110(N) may direct the modified data processing microservice to reprocess the corresponding data file in the faulty data cache 114.

The modification of the incoming sensor data may be performed by modifying the data file that contains the incoming sensor data. In some instances, the data file may be modified with corrected and/or supplemental data. For example, the incoming sensor data from a data collection device may be missing certain information (e.g., time stamp information, geolocation information, and/or so forth) that is used by a data processing microservice to process the sensor data, thereby resulting in a data process error. In such instances, the error management microservice 110(N) may obtain additional information (e.g., time stamp information, geolocation information, and/or so forth) from other data collection devices that are determined to be proximate to the data collection device. Thus, the error management microservice 110(N) may perform data modification 122 to integrate the additional information into the data file of the incoming sensor data stored in the faulty data cache 114.

In other instances, the data file may have one or more file parameters (e.g., a file format, a file size, etc.) that do not meet the file parameter requirements of the data processing microservice. In such instances, the error management microservice 110(N) may perform data modification 122 to convert the data file stored in the faulty data cache 114 into a data file with file format parameters that are compatible with the data processing microservice. For example, the error management microservice 110(N) may use a file conversion algorithm of a data modification tool to convert the data file into a compatible format or split the data file into multiple data files. Subsequently, the error management microservice 110(N) may direct the data processing microservice to reprocess the modified data file stored in the faulty data cache 114.

In some embodiments, the error management microservice 110(N) may apply a data modification 122 that is manually inputted by an administrator of the data processing platform 102 to the data processing microservice. In such embodiments, the administrator may use a management application interface 124 to monitor the data error event queue 116. Upon noticing that data error event entry in the queue, the administrator may use various diagnostic tools to review the information included in the data error event entry and/or the corresponding data file stored in the faulty data cache 114 to determine the appropriate data modification 122 to make to the corresponding data file. For example, the application tools may include a data viewer, a data parser, a data integrity checker, a data editor, and/or so forth. Once the data modification 122 is made by the administrator to the data file via a data modification tool, the administrator may use the error management microservice 110(N) to direct the processing microservice to reprocess the modified data file.

For example, the incoming sensor data from a data collection device in the form of a body cam may be a multimedia data file (e.g., an audiovisual recording) that is missing geolocation information due to a malfunction or a loss of GPS signal by the data collection device. The missing geolocation data may cause the data processing microservice to experience an error during data processing. In such a scenario, the administrator may use the management application interface 124 to access another database (e.g., a device usage database) to determine that at the time and the date that the recording of the multimedia data file is initiated by the data collection device, a user of the data collection device is also using another data collection device in the form of a smartphone. Accordingly, the administrator may then use the management application interface 124 to access a location tracking log of the smartphone to determine the geolocation information of the smartphone at the time and the date that the recording of the multimedia data file is initiated by the body cam. The administrator may then use the management application interface 124 to integrate the geolocation information obtained from the smartphone into the multimedia data file and initiate a reprocessing of the modified multimedia data file.

In another example, the incoming sensor data from a data collection device in the form of a holster sensor that monitors holstering and unholstering of a gun by a law enforcement officer may indicate an unholstering event, but the event log entry for the unholstering event may be missing a timestamp due to a temporary malfunction of the sensor. Such a missing time may cause the data processing microservice that is processing the incoming sensor data to experience an error. In such a scenario, the administrator may use the management application interface 124 to review various multimedia footages captured by the body cams of other law enforcement officers that are present at a scene with the law enforcement officer to find multimedia footage that shows the law enforcement officer unholstering the gun of the law enforcement officer. By noting the time displayed by the multimedia footage at the moment that the law enforcement officer unholstered the gun, the administrator may discover the time at which the unholstering event occurred. The administrator may then use the management application interface 124 to integrate the time information into the event log entry for the unholstering event and initiate a reprocessing of the modified event log entry.

In other embodiments, the error management microservice 110(N) may automatically apply the data modification 122 to the corresponding data file. In such embodiments, the error management microservice 110(N) may be configured to use one or more logic algorithms (e.g., a decision tree algorithm, a pattern matching algorithm, and/or so forth) to review the information included in the data error event entry and/or the corresponding data file stored in the faulty data cache 114 to determine the specific data modifications to be performed on the data file. Subsequently, the error management microservice 110(N) may use a script function to automatically activate the data modification tool to make the data modification 122 to the incoming sensor data included in the data file, for example, a script executed by the script function for the error management microservice 110(N) to obtain data missing from a data file of incoming sensor data (e.g., time stamp data, geolocation data, etc.) from an alternative source of sensor data and integrated into the data file. Subsequently, the error management microservice 110(N) may direct the modified data processing microservice to reprocess the corresponding data file in the faulty data cache 114. In some embodiments, the error management microservice 110(N) may be configured to automatically, or under the direction of an administrator, perform both code modification 120 and data modification 122 with respect to a data file of incoming sensor data.

In various embodiments, the error management microservice 110 may be configured to store information regarding each data modification that is made to the data file of the incoming sensor data in a corresponding ledger entry in the chain-of-custody ledger 126. The information included in a ledger entry may include a file identifier of the data file, date and time of the data modification, a user identity of the administrator that requested the data modification, a description of the data modification, and/or so forth. In some instances, the information included in the ledger entry may further include a digital signature (e.g., a checksum value, a cryptographic hash value, etc.) of the data file prior to the data file and a digital signature of the data file following the data modification. In this way, the data modifications that are performed on each data file may be fully tracked for the purpose of determining the evidentiary value of the data file in future judicial proceedings.

In some embodiments, the error management microservice 110(N) may include an administrative reporting function that generates statistical and summary reports for viewing by an administrator based on the information from the data error event queue 116. For example, the reports may indicate the data files of sensor data that are currently causing errors, the identifiers of data collection devices that are the sources of the data files, the microservices that are experiencing errors, the error resolution status of the errors, the time duration between each error occurrence and each error resolution, a listing of the frequency for each error type during a particular time period, a list of identifiers of data collection devices that are experiencing the most errors in the particular time period, and/or so forth. In such embodiments, these statistical and summary reports may be accessed via the management application interface 124.

In other embodiments, the error management microservice 110(N) may include a user reporting function that generates statistical and status notifications for viewing by customers based on the information from the data error event queue 116. For example, the customers may be the authorized users of law enforcement agencies that use the data processing platform 102. The notifications for a particular customer may show the data collection devices used by the particular authorized users that are currently experiencing errors, the times and dates that the errors are initially reported, the resolution status of the errors, and/or so forth. In such embodiments, these statistical and summary notifications may be accessed via a user application interface 128 that is provided by the error management service 110(N). In this way, an authorized representative of the customer may be kept apprised of the condition of the sensor data collected by the data collection devices in use by the customer.

Example Data Processing Platform Architecture

Figure 2:
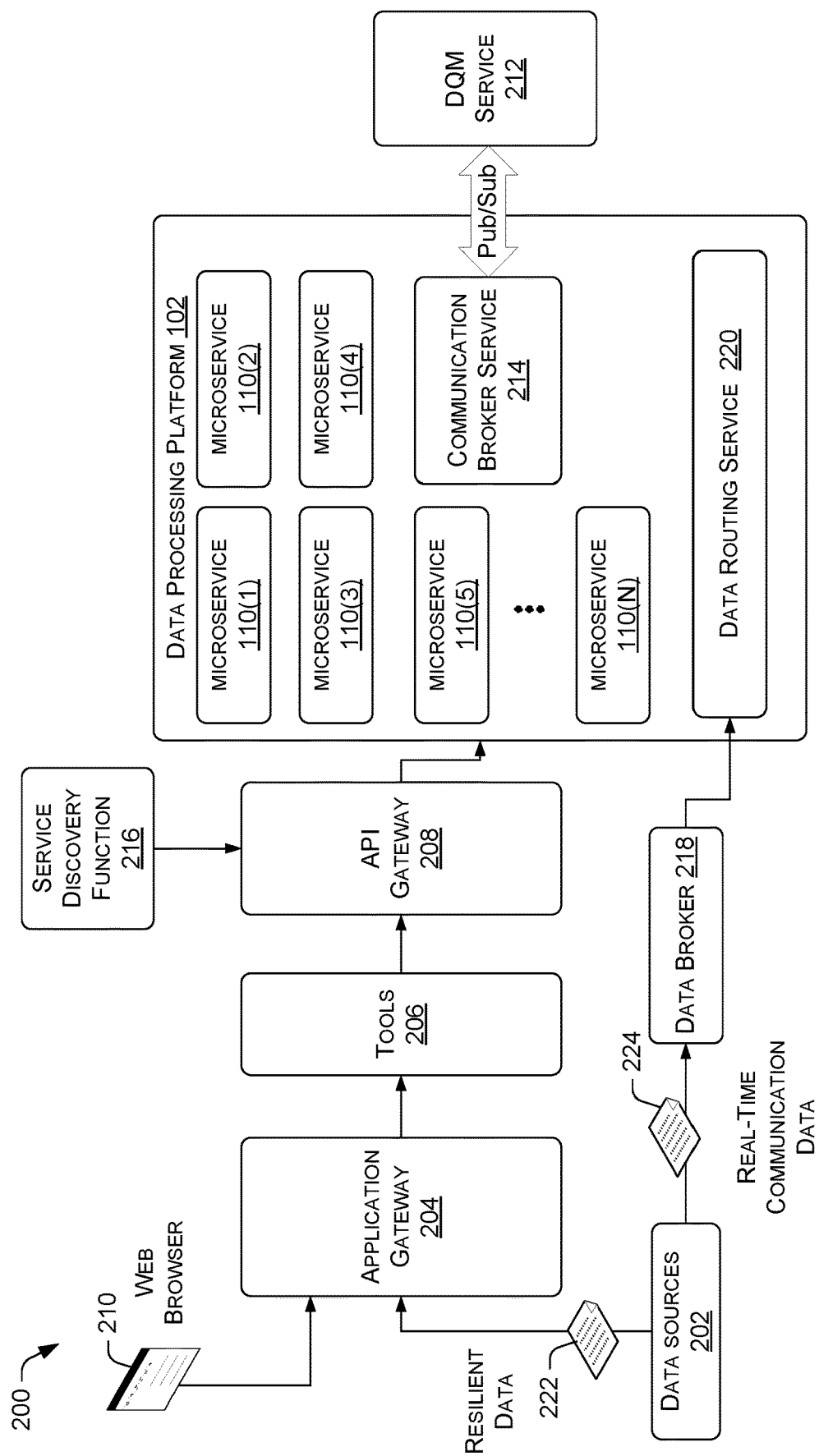
FIG. 2 illustrates an architecture of a data processing platform that includes a microservice for performing service-side remediation with respect to incoming sensor data received from multiple data collection devices.

FIG. 2 illustrates an architecture 200 of a data processing platform that includes a microservice for performing service-side remediation with respect to incoming sensor data received from multiple data collection devices. The architecture 200 may include the data processing platform 102 which is developed to perform a specific set of processing tasks with respect to incoming data. The data processing platform 102 may include microservices 110(1)-110(N) that independently perform different processing tasks on data, such as data originating from one or more data sources 202 and/or other microservices, to achieve data process objectives. In one implementation, the data sources 202 may include the data collections 104(1)-104(N). In some instances, data from the data sources 202 may reach the various microservices 110(1)-110(N) of the data processing platform 102 via an application gateway 204, tools 206, and/or the API gateway 208. For example, the application gateway 204 may be responsible for receiving data from one or more data collection devices of the data sources 202. In some embodiments, the application gateway 204 may be implemented using an Azure® Application Gateway or some other comparable application gateway.

The tools 206 may include data management application functions that are powered by the microservices 110(1)-110(N). Thus, the tools 206 may be used to direct the microservices 110(1)-110(N) to perform specific tasks with respect to specific data collected from the data sources 202 via the API gateway 208. For example, in the context of law enforcement use, the tools 206 may include tools that enable a user to review, label, analyze, and/or redact particular data files or data packets that contain evidence, documents, or police activity data. The tools 206 may further include an administrative tool that enables an administrator to manage whether users have permission to perform such tasks. In some embodiments, the tools 206 may be provided by a web application that is accessible via a web browser 210 through the application gateway 204. In some implementations, the API gateway 208 that enables the tools 206 to invoke the microservices 110(1)-110(N) may be a .NET API gateway, such as an Ocelot API gateway. As such, data and data processing requests may be communicated to the data processing platform 102 via the Hypertext Transfer Protocol Secure (HTTPS) protocol or a comparable protocol.

In various embodiments, the microservices 110(1)-110(N) of the data processing platform 102 may use an optimized publisher-and-subscriber model to communicate with each other. In this publisher-and-subscriber model, each of the microservices 110(1)-110(N) is configured with a data distribution inbox and a data distribution outbox. The data distribution inbox of a microservice may enable the microservice to receive input message data from a data source or other microservices so that the microservice may process the received input message data. Likewise, the data distribution outbox of a microservice may enable the microservice to provide output message data to other microservices for further processing by those microservices. The underlying publisher-and-subscriber framework for enabling this model may be provided by a distributed queue management service 212. For example, the service may be provided by the Kafka® Event Hub developed by the Apache Software Foundation, the HiveMQ® MQTT broker developed by the HiveMQ GmbH of Germany, or some other comparable software service. The distributed queue management service 212 may be configured to subscribe to the data distribution outboxes of all microservices in the microservices platform. The distributed queue management service 212 may be further controlled by a communication broker service 214 that uses the publisher-and-subscriber framework to selectively route message data between various microservices according to business logic.

In operation, a microservice, such as the microservice 110(1), may process incoming data from a data source or another microservice. As a part of its data processing, the microservice may be configured to generate message data that is to be provided to other microservices for additional processing. Accordingly, the microservice may place message data in its data distribution outbox. Since the distributed queue management service 212 subscribes to the data distribution outboxes of all microservices in the microservices platform, the distributed queue management service 212 may become aware that the microservice has placed message data in its data distribution outbox. Subsequently, the distributed queue management service 212 may transfer the message data to its data store and notify the communication broker service 214 that the microservice has published the message data.

In turn, the communication broker service 214 may apply a business logic to determine one or more additional microservices (e.g., microservice 110(2) and microservice 110(4)) that are preconfigured by the business logic to receive the message data from the microservice. For example, the business logic may include a routing table that specifies that microservice 110(2) and 110(3) are configured to always receive data that is outputted by the microservice 110(1). Once the one or more recipient microservices are identified based on the business logic, the communication broker service 214 may direct the distributed queue management service 212 to distribute the message data from the microservice to the one or more corresponding data distribution inboxes of the one or more additional microservices.

For example, in the context of law enforcement use, the microservice 110(1) may be a microservice that processes new data from a data source, such as labeling and classification of the data, as well as routing of the data to a data store (e.g., a blob data store) for storage. The microservice 110(1) may be designed to further trigger the microservice 110(2) and the microservice 110(3) to perform additional functions with respect to the data. The microservice 110(2) may be a search microservice that is to be triggered to search the data store for additional data that correlates to the data.

The microservice 110(3) may be a command center application that is to be triggered to use a web interface to notify a human administrator at an operation center that a new piece of data has arrived. In such a scenario, the microservice 110(1) may trigger the microservice 110(2) and the microservice 110(3) by placing the data or a link to a storage location of the data as message data in the data distribution outbox of the microservice 110(1). Subsequently, the communication broker service 214 may direct the distributed queue management service 212 to distribute the message data that is collected by the distributed queue management service 212 from the data distribution outbox of the microservice 110(1) to the data distribution inboxes of the microservice 110(2) and the microservice 110(3).

In this way, the use of the communication broker service 214 may prevent data processing bottlenecks between microservices that can occur in a traditional approach where each microservice is responsible for calling a downstream microservice. In the example above, if the microservice 110(2) is offline, the traditional approach may result in the microservice 110(1) passing data to the microservice 110(2) and then receiving a notification that the microservice 110(2) has failed. This may result in the microservice 110(1) halting its data processing operation until microservice 110(2) comes back online so as to verify that the microservice 110(2) has performed its task. However, with the use of the communication broker service 214 in conjunction with the distributed queue management service 212, the distributed queue management service 212 may store the data from the microservice 110(1) in its data store, and then provide the data to the data distribution inbox of the microservice 110(2) when the microservice 110(2) comes back online. In other words, with the implementation of the communication broker service 214 in conjunction with the distributed queue management service 212, the responsibility for ensuring data integrity for the purpose of data resiliency and atomic data operations may be transferred away from the individual microservices 110(1)-110(N) of the data processing platform 102 and to the communication broker service 214. Nevertheless, the microservices may also have the ability to output data directly to a non-microservice application, such as a web service that interfaces with a client application or a web browser.

The business logic (e.g., data routing paths listed in the routing table) that is used by communication broker service 214 may be modified as new microservices are added to the data processing platform 102 or removed from the data processing platform 102, or as the software architecture of the data processing platform 102 is updated. For example, there may be an existing data routing path in a routing table that routes the output data of a first microservice to a second microservice. However, when a third microservice is added to the microservices platform, another data routing path may be added to the routing table that routes the output data of the first microservice to the third microservice. Likewise, the routing table may list routing paths that route the output data of the first microservice to a second microservice and a third microservice of the microservices platform. However, when the second microservice is removed from the microservices, the routing table may be modified so that the routing path for the routing of output data from the first microservice to the second microservice may be eliminated from the routing table. In some embodiments, the tools 206 may include an application that enables a user to modify the business logic via a web interface that is accessible via a web browser, such as the web browser 210. Such ability may simplify the reconfiguration of the data processing platform 102 and/or the development of new microservices for the data processing platform 102.

The data processing platform 102 may further include a service discovery function 216. The service discovery function 216 may route incoming data that initially arrives from the data sources 202 to one or more of the microservices 110(1)-110(N) for processing based on one or more routing parameters, such as data type, device type, and/or so forth. For example, the service discovery function 216 may include logic that dictates that data of one or more first particular data types or from devices of one or more first particular device types are to be initially routed to one or more first microservices for processing, while data of one or more second particular data types or from devices of one or more second particular device types are to be initially routed to one or more second microservices for processing. Such routing may be performed by placing the incoming data or data storage location information of the incoming data in the data distribution inbox of the corresponding microservice. Further, the service discovery function 216 may be configured to determine, based on a data processing request that is invoked using a tool of the tools 206, the appropriate microservice of the microservice 110(1)-110(N) that is to be invoked to process data.

Additionally, the service discovery function 216 may monitor the data characteristics of the data that is routed to the data processing platform 102 by the API gateway 208. For example, the data characteristics may include the data types of data (e.g., biometric sensor data, vehicle sensor data, video data, event notification data, etc.), an amount of each type of data received in a predetermined time period, the device types of the devices that supplied the data, and/or so forth. Based on such data characteristics, the service discovery function 216 may instantiate one or more instances of at least one microservice or terminate one or more additional instances of at least one microservice based on the changes in data processing demands that correlate to the data characteristics of the data that passes through the API gateway 208. Alternatively, or concurrently, the service discovery function 216 may instantiate one or more instances of at least one microservice or terminate one or more additional instances of at least one microservice based on the number and types of functionality requests that are invoked through the tools 206. In some instances, the service discovery function 216 may be implemented using the Consul® discovery service developed by HashiCorp.

As an alternative, data from the data sources 202 may reach the various microservices 110(1)-110(N) of the data processing platform 102 for processing via a data broker 218 and a data routing service 220. For example, the data broker 218 may be implemented using the HiveMQ MQTT broker, and the data routing service may be an MQTT router. In various embodiments, this alternative data distribution pathway may be used for distributing data that does not need to meet the same requirements for data integrity and resiliency as other data that is deemed to be critical enough to be distributed via the implementation of the communication broker service 214 in conjunction with the distributed queue management service 212. Instead, such data may be distributed to a microservice or a web service in the most expedient way possible for processing. For example, such distribution may avoid the delay caused by the queueing of message data by the distributed queue management service 212 during peak platform usage times. In various embodiments, the data that is distributed to one or more microservices or a web service may be real-time communication data. The real-time communication data includes data whose value is time-sensitive, meaning that the value may degrade or become worthless if not processed, used, and/or acted upon in an expedient manner. For example, in the context of law enforcement use, the real-time communication data may include the real-time geolocation of a law enforcement officer that is chasing a suspect, in which the real-time geolocation is to be rendered on a digital map accessible to a web browser by a microservice or a web service. Thus, any delay in processing or using the data may mean that the additional officers may be dispatched to an outdated geolocation, resulting in the officers being unable to timely reach a current location of the law enforcement officer to render aid or capture suspects. In another example, a real-time notification may come from a user device of a law enforcement officer indicating that a crime is in progress at a particular geolocation. Once again, there may be a need to quickly render the location of the crime event on a digital map so that additional officers can timely respond to the location to arrest suspects or render aid.

Thus, the application gateway 204 and the data broker 218 may be configured to divide up the distribution of data from the data sources 202 by data type. For example, non-real-time communication data that are required to meet higher data integrity and atomic data operation requirements, a.k.a., resilient data 222, may be provided by the application gateway 204 to the microservices 110(1)-110(N) via the publisher-to-subscriber model. In contrast, real-time communication data 224 may be distributed to one or more microservices or one or more web services via the data broker 218 and the data routing service 220. For example, the data routing service 220 may use the gRPC protocol to distribute the real-time communication data to a microservice for processing or to a web socket of a web service that is running a gRPC host for rendering on a webpage. In such embodiments, a data source device that is sending data may include an internal routing logic that directs the device to send resilient data 222 from the device to the data processing platform 102 via the application gateway 204, and the real-time communication data 224 from the device to the data processing platform 102 via the data broker 218. In alternative embodiments, the real-time communication data 224 may reach the data processing platform 102 via the API gateway 208, but then the communication broker service 214 or another routing service function of the microservice of the data processing platform 102 may determine that since the incoming data is real-time communication data instead of resilient data, the real-time communication data is to be routed to one or more microservices via the data routing service 220.

Example Components of a Microservice

Figure 3:
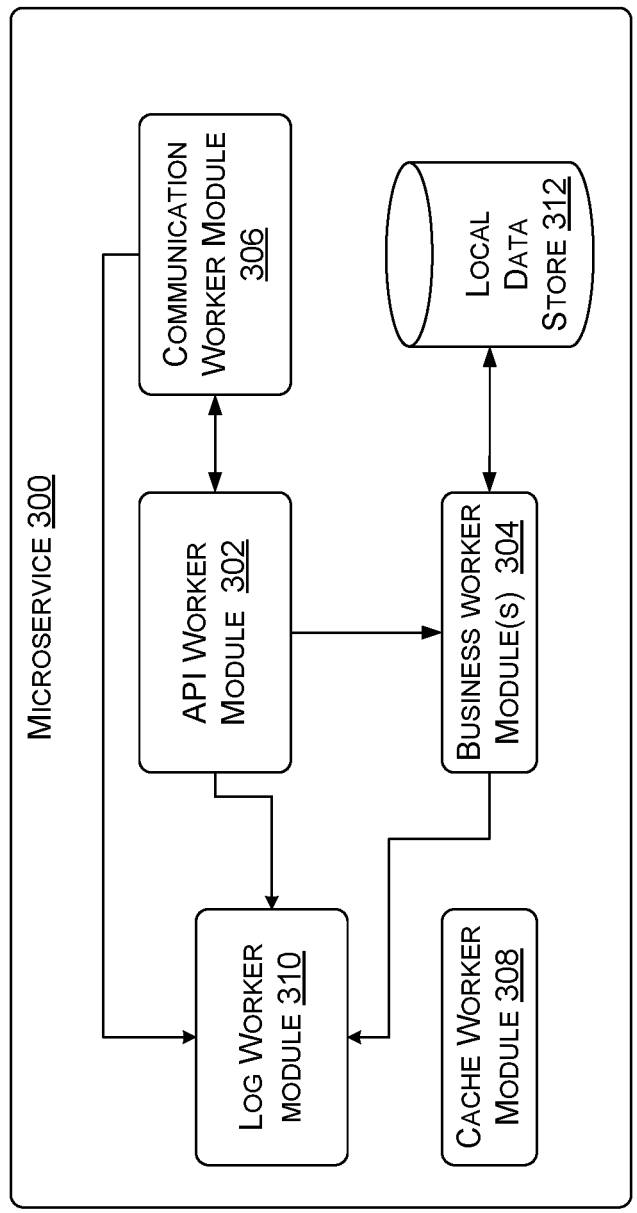
FIG. 3 is a block diagram showing example components of a microservice that is included in the data processing platform that supports server-side remediation for incoming sensor data received from multiple data collection devices.

FIG. 3 is a block diagram showing example components of a microservice that uses the optimized interservice communication for microservices. The example microservice 300 may represent any of the microservices 110(1)-110(N) that are present in the data processing platform 102. The example microservice 300 may include an API worker module 302, one or more business worker modules 304, a communication worker module 306, a cache worker module 308, a log worker module 310, and a local data store 312. Each of these modules may include routines, program instructions, objects, and/or data structures that are executable by a processor to perform particular tasks or implement particular abstract data types. The API worker module 302 may be configured to orchestrate the various data processing tasks that are performed by the microservice 300 for incoming data. For instance, when the API worker module 302 determines that the microservice 300 has received incoming data for which a data processing method is to be performed, the API worker module 302 may allocate one or more of the business worker modules 304 to each perform a particular data processing operation of the data processing method on the incoming data. The API worker module 302 may allocate multiple business worker modules to perform their operations concurrently and/or consecutively. Each of the business worker modules 304 may perform its operation to produce output data, which may be further processed by another business worker module and/or stored in a storage location, e.g., a data table, a data store, and/or so forth.

In some embodiments, the business worker modules 304 may store the output data or processed data in the local data store 312. In other embodiments, the business worker modules 304 may store such output data or processed data in a centralized data storage, such as an on-premises or cloud-based binary large object (blob) storage, and store data management data for the data that are stored in the blob storage (e.g., links to blob data files, index keys of the blob data files, and other metadata for the blob data files) in the local data store 312. Such data management data stored in the local data store 312 may enable the microservice 300 to access and retrieve stored data from the centralized cloud storage. For example, the API worker module 302 of the microservice 300 may invoke another microservice that is configured to interface with the centralized data storage with the corresponding metadata in order to store and/or retrieve data files from the centralized data storage. In various embodiments, the local data store 312 may include one or more Structured Query Language (SQL) databases that are configured for dedicated use by the microservice 300.

The communication worker module 306 may be called upon by the API worker module 302 to interface with the publisher-to-subscriber framework. For example, the communication worker module 306 may retrieve input data from the data distribution inbox of the microservice 300 and provide the input data to the one or more business worker modules 304 for processing by the one or more business worker modules 304. The communication worker module 306 may also place output data generated by the microservice 300 in a data distribution outbox of the microservice 300. In some instances, the communication worker module 306 may be configured to also receive input data directly from the data routing service 220. The cache worker module 308 may be used by the API worker module 302 and/or the business worker modules 304 to store output data or processed data generated by one or more worker modules in a data cache for faster access during data processing.

Finally, the log worker module 310 may track the operations that are performed by the other modules of the microservice 300 and store information regarding the operations in an internal log. For example, the information related to an operation may include an identifier of the operation, a description of the operation, a time and date of the operation, a success and/or failure indication for the operation, and/or so forth.

Thus, the components of the microservice 300 may be representative of the components of the error management microservice 110(N). For example, the error management microservice 110(N) may include business worker modules that perform the various tasks described in FIG. 1., such as the code modification 120 and the data modification 122, as well as their associated tasks. Furthermore, the management application interface 124 and the user application interface 128 may be presented as web pages by the error management microservice 110(N), such that these interfaces are accessible via web browsers (e.g., web browser 210).

Example Server and Computing Device Components

Figure 4:
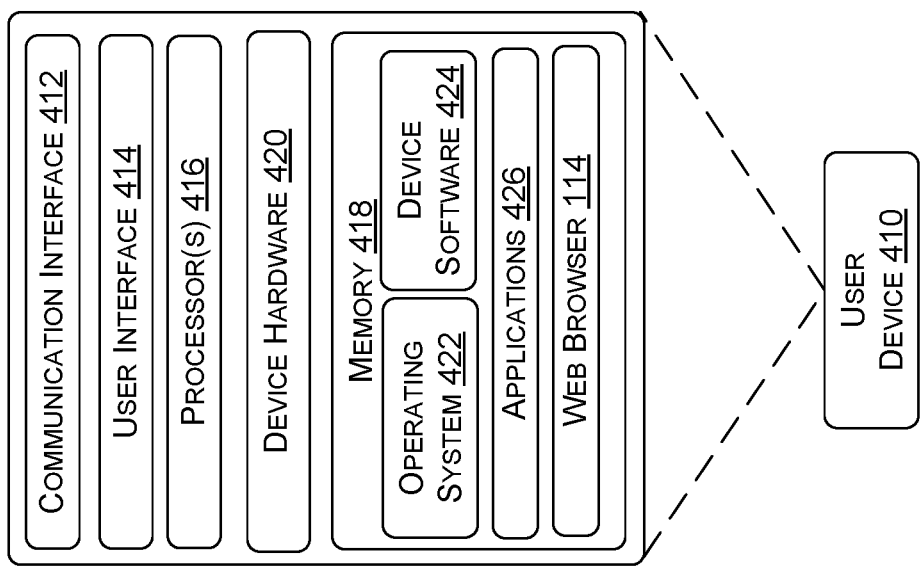
FIG. 4 is a block diagram showing various components of one or more servers and a computing device of the example environment that supports server-side remediation for incoming sensor data received from multiple data collection devices.
Figure 4:
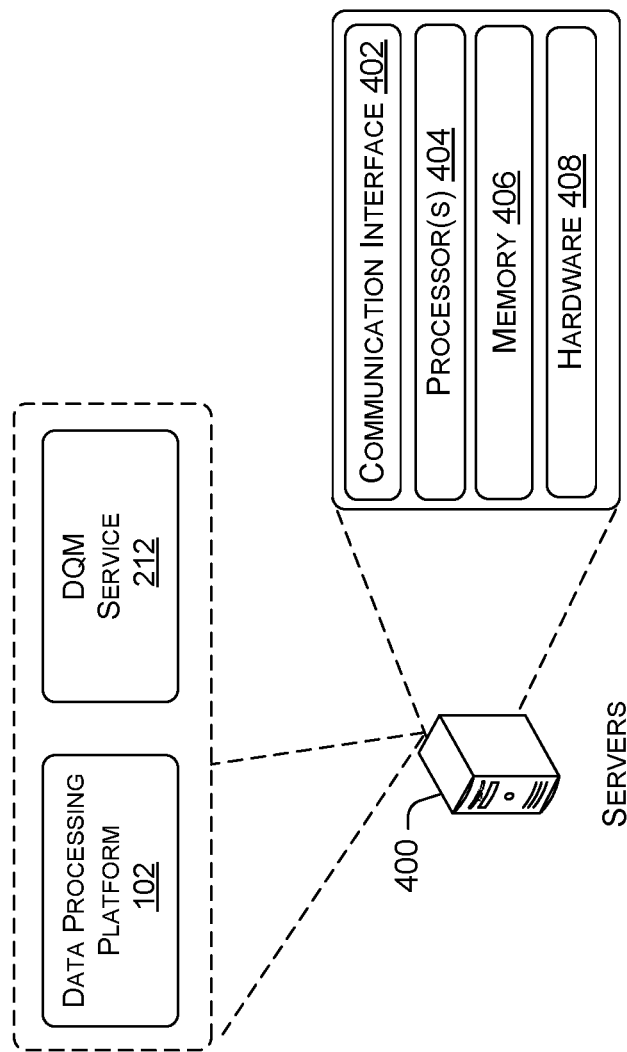

FIG. 4 is a block diagram showing various components of one or more servers and a computing device of the example environment that supports server-side remediation for incoming sensor data received from multiple data collection devices. The one or more servers 400 may be implemented using one or more computing nodes. The computing nodes may include a communication interface 402, one or more processors 404, memory 406, and hardware 408. The communication interface 402 may include wireless and/or wired communication components that enable the servers 400 to transmit data to and receive data from other networked devices. The hardware 408 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 406 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the servers 400 or components thereof may be implemented using virtual computing devices in the form of virtual machines or software containers that are hosted in a computing cloud. The computing cloud may include a variety of disaggregated servers that provide virtual application server functionalities and virtual storage functionalities.

For example, the computing cloud may include multiple physical computer servers that are disaggregated via a hypervisor. The physical computer servers each may have one or more processors, memory, at least I/O interface, and/or network interface. The features and variations of the processors, memory, the I/O interface, and the network interface are substantially similar to those described for the servers 400. The computing cloud may include a hypervisor that can delegate calls to any portion of hardware in the underlying physical servers, and upon request generate a virtual machine from the separate portions of hardware. A virtual machine may host not only software applications, components including services, but also virtual web server functionalities and virtual storage/database functionalities.

The virtual machines themselves may be further partitioned into containers, which enable the execution of a program in an independent subset of the virtual machine. Software such as Kubernetes, Mesos, and Docker are examples of container management software. Unlike virtual machines which have a delay in startup due to the need for provisioning an entire OS, containers may be generated more quickly and on-demand since the underlying virtual machine is already provisioned. The computing cloud may embody an abstraction of services. Common examples include service abstractions such as Platform as a Service ("PAAS"), Infrastructure as a Service ("IAAS"), and Software as a Service ("SAAS"). Accordingly, the servers 400 and/or their computing cloud equivalent may provide an execution environment for the execution of the data processing platform 102 and the distributed queue management service 212. Each of the distributed queue management service 212 and the communication broker service 214 may include routines, program instructions, objects, and/or data structures that are executable by a processor to perform particular tasks or implement particular abstract data types. The execution environment may be further used for the execution and/or implementation of other components (e.g., gateways, tools, brokers, functions, data stores, etc.) illustrated in FIG. 1.

As further shown in FIG. 4, a user device 410 may be representative of any user device that may be used to interface with the data processing platform 102. The user device 410 may include a communication interface 412, a user interface 414, one or more processors 416, memory 418, and device hardware 420. The communication interface 412 may include wireless and/or wired communication components that enable the electronic device to transmit or receive voice or data communication via the wireless carrier network, as well as other telecommunication and/or data communication networks.

The user interface 414 may enable a user to provide inputs and receive outputs from the 410. The user interface 414 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 418 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 420 may include a modem that enables the user device 410 to perform telecommunication and data communication with a network. The device hardware 420 may further include signal converters, antennas, hardware decoders and encoders, graphics processors, a universal integrated circuit card (UICC) or an embedded UICC (eUICC), and/or the like that enable the user device 410 to execute applications and provide telecommunication and data communication functions.

The one or more processors 416 and the memory 418 of the user device 410 may implement an operating system 422, device software 424, one or more applications 426, and the web browser 210. Such software may include routines, program instructions, objects, and/or data structures that are executed by the processors 416 to perform particular tasks or implement particular abstract data types.

The operating system 422 may include components that enable the user device 410 to receive and transmit data via various interfaces (e.g., user controls, communication interface 412, and/or memory input/output devices). The operating system 422 may also process data using the one or more processors 416 to generate outputs based on inputs that are received via the user interface 414. For example, the operating system 422 may provide an execution environment for the execution of the applications 426 and the web browser 210. The operating system 422 may include a presentation component that presents the output (e.g., display the data on an electronic display, store the data in memory, transmit the data to another electronic device, etc.).

The operating system 422 may include an interface layer that enables applications to interface with the modem and/or the communication interface 412. The interface layer may comprise public APIs, private APIs, or a combination of both public APIs and private APIs. Additionally, the operating system 422 may include other components that perform various other functions generally associated with an operating system. The device software 424 may include software components that enable the user device to perform functions. For example, the device software 424 may include basic input/output system (BIOS), bootrom, or a bootloader that boots up the user device 410 and executes the operating system 422 following power-up of the device.

The applications 426 may include applications that provide utility, entertainment, and/or productivity functionalities to a user of the user device 410. The web browser 210 may enable a user to access web pages for interacting with various functionalities offered by the data processing platform 102.

Example Device Error Status Dashboard

Figure 5:
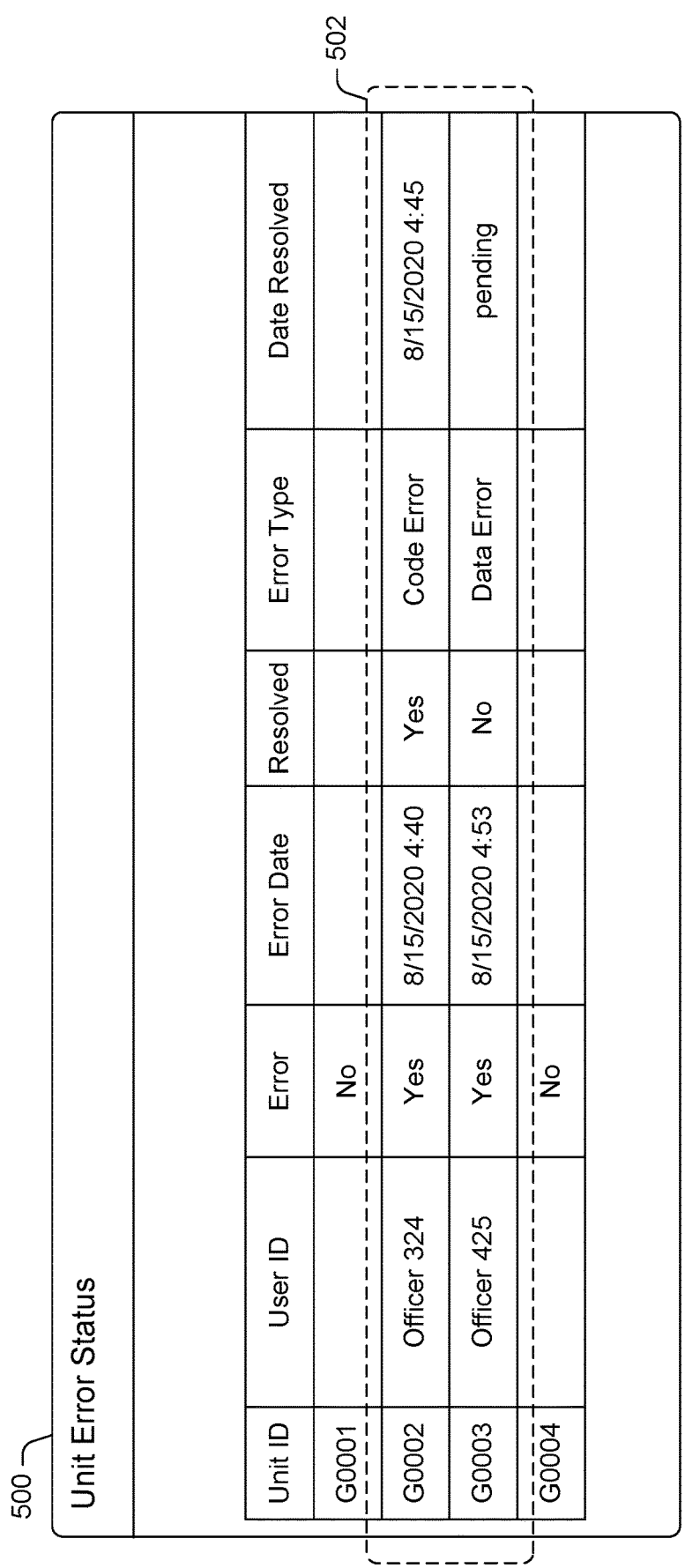
FIG. 5 illustrates an example device error status dashboard provided by a user application that shows the error statuses of data collection devices that provide sensor data to the data processing platform.

FIG. 5 illustrates an example device error status dashboard 500 provided by a user application that shows the error statuses of data collection devices that provide sensor data to the data processing platform. In various embodiments, the device error status dashboard 500 may be presented via the user application interface 128 to an authorized user of a customer to view error status related to the data collection devices used by the customer. For example, the device error dashboard may be presented via one or more web pages by the user application interface 128. The web pages may be in the form of HyperText Markup Language (HTML) documents, in which the documents may include text content, images, multimedia content, cascade style sheets (CSS), and/or scripts. In such embodiments, the data processing platform 102 may use an application server that supports server-side scripting via multiple scripting languages, such as Active Server Pages (ASP), Hypertext Preprocessor (PHP), JavaScript, and other scripting languages to support the dynamic generation of web pages.

In various embodiments, the error management microservice 110(N) may include an access control function that authenticates authorized users via their authentication credentials (e.g., username, password, etc.) to ensure that only authorized users are able to access the error statuses of their corresponding data collection devices. As shown in FIG. 5, the dashboard 500 may show a list of data collection devices that are associated with a particular customer, in which each device is identified by a device identifier.

The dashboard 500 may include a portion 502 that shows some data collection devices that are experiencing data processing errors. The portion 502 may further show the user identifiers of the users that are associated with the two devices. For example, the data collection devices may be body cams and the users may be law enforcement officers that are assigned to wear the body cams as they perform their law enforcement duties. In some embodiments, the error management microservice 110(N) may use a metadata extraction function to extract the user identifiers of the users from the metadata included in the data files of incoming sensor data that caused the errors. Subsequently, the error management microservice 110(N) may populate each user identifier with the corresponding device identifier. For each of the user devices listed in portion 502, the dashboard 500 may show a date and time that the data processing error occurred, the error type, whether the data processing error is resolved, the date and time that the data processing error is resolved, and/or so forth.

Example Processes

Figure 6:
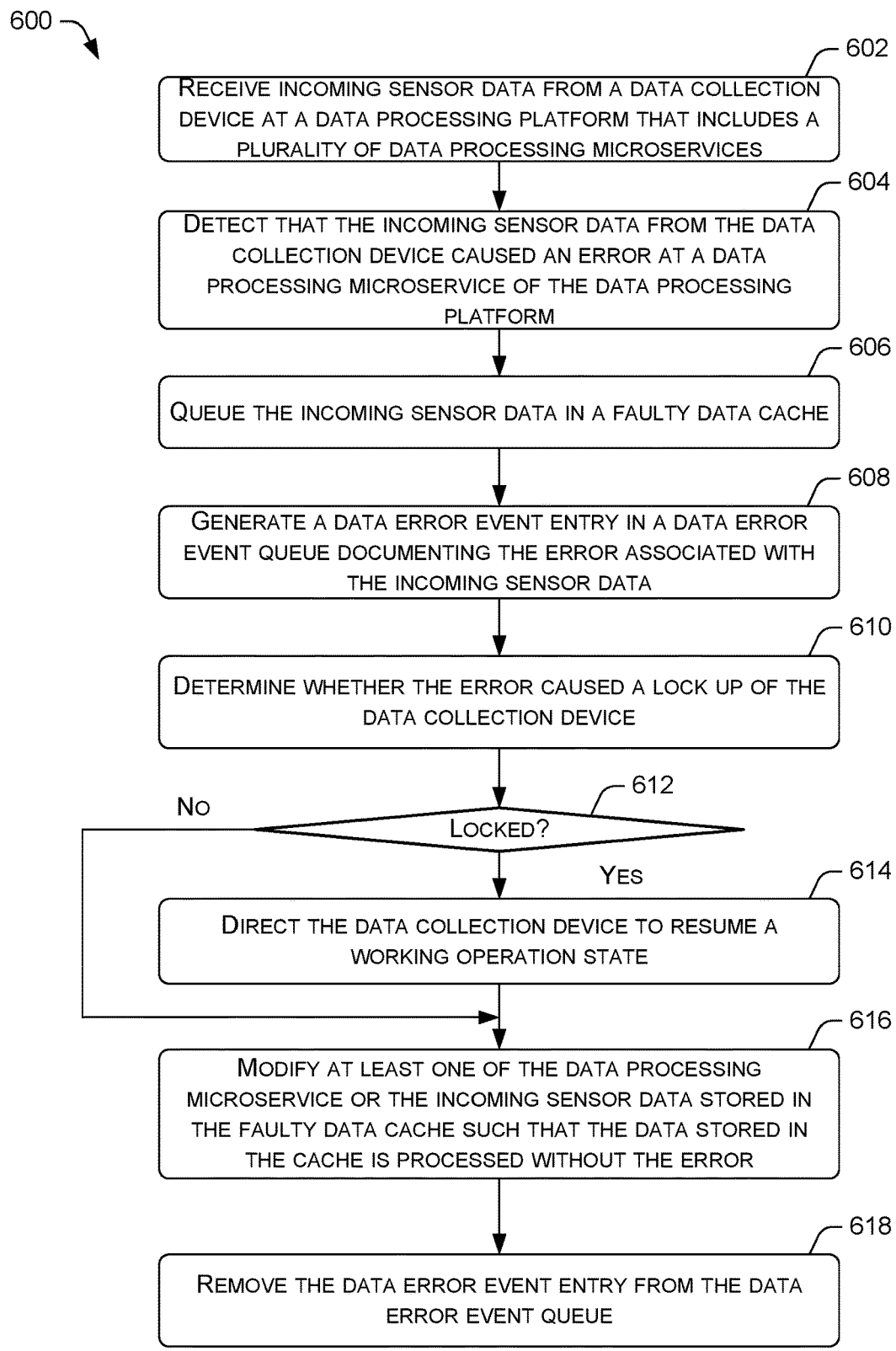
FIG. 6 illustrates a flow diagram of an example process for performing service-side remediation with respect to incoming sensor data received from a data collection device.
Figure 7:
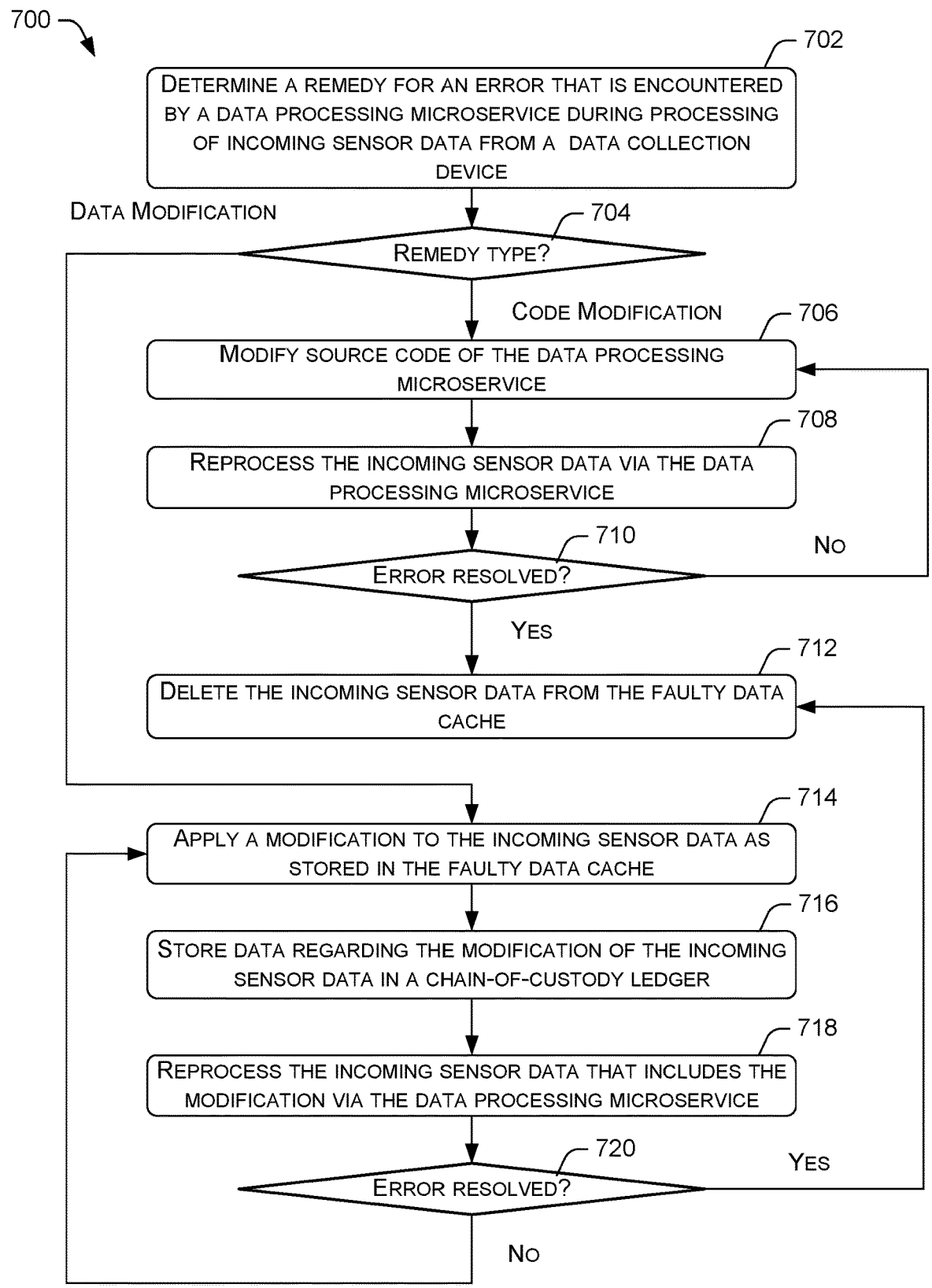
FIG. 7 illustrates a flow diagram of an example process for performing a server-side code modification or data modification with respect to incoming sensor data received from a data collection device.
Figure 8:
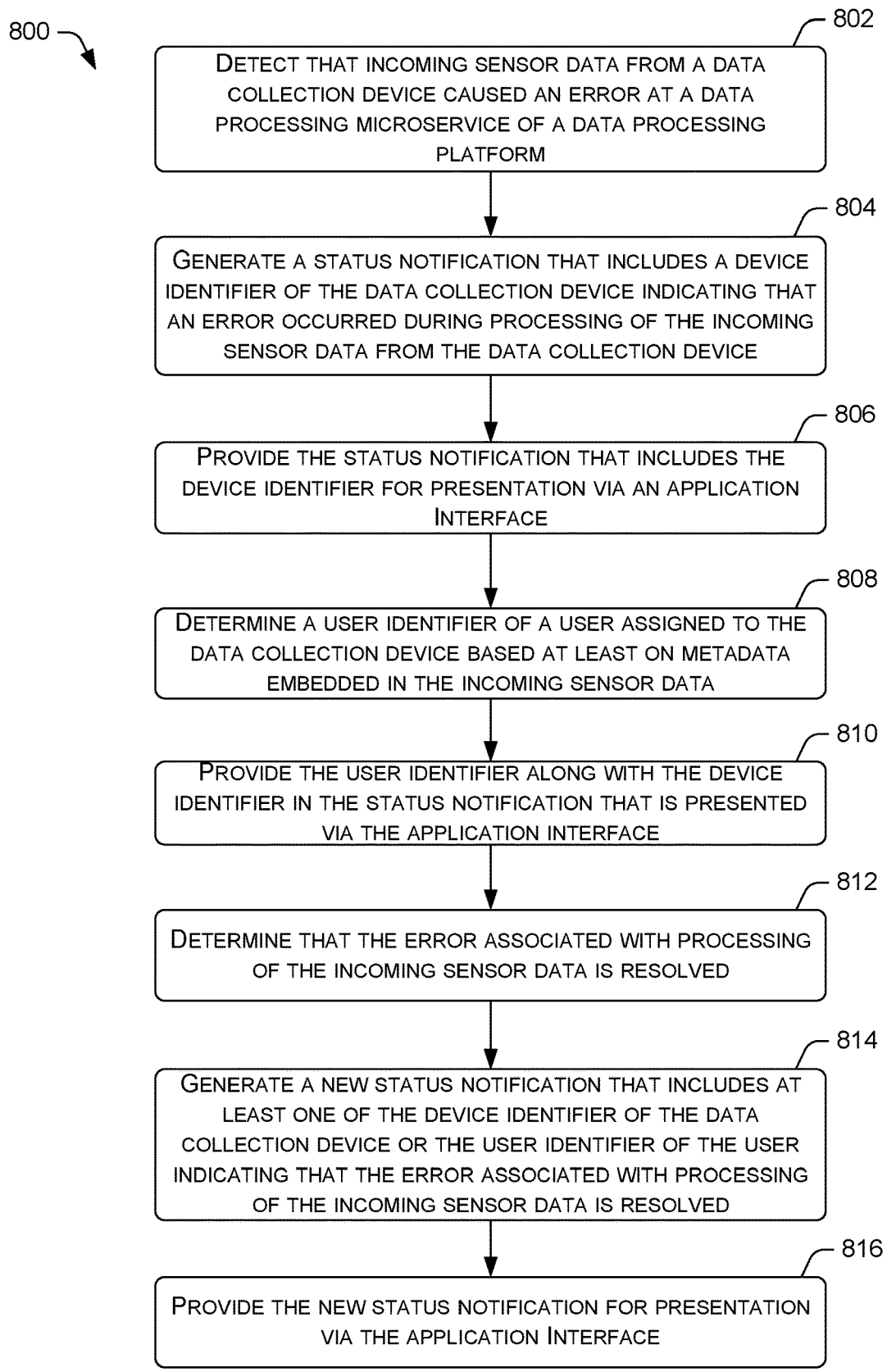
FIG. 8 illustrates a flow diagram of an example process for providing notifications related to service-side remediation performed for incoming sensor data received from a data collection device.

FIGS. 6-8 present illustrative processes 600-800 for providing server-side remediation for incoming sensor data received from multiple data collection devices. Each of the processes 600-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described for each process is not intended to be construed as a limitation, and any number of the described blocks can be combined in any order and/or in parallel to implement the process. For discussion purposes, the processes 600-800 are described with reference to the environment 100 of FIG. 1.

FIG. 6 illustrates a flow diagram of an example process 600 for performing service-side remediation with respect to incoming sensor data received from a data collection device. At block 602, the data processing platform 102 may receive incoming sensor data from a data collection device that includes a plurality of data processing microservices. In various embodiments, a data collection device may periodically or continuously synchronize with the data processing platform 102 to upload sensor data to the platform via a network 106.

At block 604, the data processing platform 102 may detect that the incoming sensor data from the data collection device caused an error at a data processing microservice of the data processing platform. The error may be caused by various problems. Some of these problems may include a large size of the data file causing the data processing microservice to time out during file transfer, the data file containing special characters that are not recognized as valid data values by the data processing microservice, programming errors that cause the data processing microservice to fail to properly parse the data packets included in the data file, and/or so forth. At block 606, the data processing platform 102 may queue the incoming sensor data in a faulty data cache.

At block 608, the data processing platform 102 may generate a data error event entry in a data error event queue documenting the error associated with the incoming sensor data. For example, the data error event entry may include a data file identifier that identifies the corresponding data file stored in the faulty data cache, a microservice identifier of the data processing microservice that experienced the error, an error code associated with the error, a corresponding description of the error that is generated based on the error code, and/or so forth.

At block 610, the data processing platform 102 may determine whether the error caused a lock up of the data collection device. For example, the data collection device may be locked in an operation loop where the device is continuously retrying the sending of the incoming sensor data to the data processing platform due to the lack of an expected acknowledgment message from the data processing microservice. At decision block 612, if the data collection device is locked up ("yes" at decision block 612), the process 600 may proceed to block 614. At block 614, the data processing platform 102 may direct the data collection device to resume a working operation state. For example, the data collection device may be directed to terminate the resending of the incoming sensor data, which may free up the data collection to collect additional sensor data for uploading to the platform.

At block 616, the data processing platform 102 may modify at least one of the data processing microservice or the incoming sensor data stored in the faulty data cache such that the data stored in the cache is processed without the error. At block 618, the data processing platform 102 may remove the data error event entry from the data error event queue. Returning to decision block 612, if the data collection device is not locked up ("no" at decision block 612), the process 600 may proceed directly to block 616.

FIG. 7 illustrates a flow diagram of an example process 700 for performing a server-side code modification or data modification with respect to incoming sensor data received from a data collection device. The example process 700 may further illustrate block 616 of the process 600. At block 702, the data processing platform 102 may determine a remedy for an error that is encountered by a data processing microservice of a data processing platform 102 during processing of incoming sensor data from a data collection device. In some instances, the determination may be made by one or more logic algorithms of an error management microservice of the data processing platform. In other embodiments, the determination may be manually performed by an administrator of the data processing platform 102 using various application tools that are provided by the error management microservice.

At decision block 704, if the data processing platform 102 determines that the remedy is code modification, the process 700 may proceed to block 706. At block 706, the data processing platform 102 may modify source code of the data processing microservice. The code modification may be performed using a code editing and/or application programming tool that is accessible via the error management microservice.

At block 708, the data processing platform 102 may reprocess the incoming sensor data via the data processing microservice. In various embodiments, the error management microservice 110(N) may direct the modified data processing microservice to reprocess a data file in the faulty data cache that contains the incoming sensor data.

At decision block 710, the data processing platform 102 may determine whether the error is resolved. If the error is resolved ("yes" at decision block 710), the process may proceed to block 712. At block 712, the data processing platform 102 may delete the incoming sensor data from the faulty data cache. However, if the error is not resolved ("no" at decision block 710), the process 700 may loop back to block 706 so that the source code of the data processing microservice may be further modified to resolve the error.

Returning to decision block 704, if the data processing platform 102 determines that the remedy is data modification, the process 700 may proceed to block 714. At block 714, the data processing platform 102 may apply a modification to the incoming sensor data as stored in the faulty data cache. For example, the modification may include adding additional metadata to the incoming sensor data, changing a format of the incoming sensor data, splitting the incoming sensor data into multiple data chunks, and/or so forth.

At block 716, the data processing platform 102 may store data regarding the modification of the incoming sensor data in a chain-of-custody ledger. The information included in a ledger entry may include a file identifier of a data file that contains the incoming sensor data, date and time of the data modification, a user identity of the administrator that requested the data modification, a description of the data modification, and/or so forth. In some instances, the information included in the ledger entry may further include a digital signature of the data file prior to the data file and a digital signature of the data file following the data modification. At block 718, the data processing platform 102 may reprocess the incoming sensor data that includes the modification via the data processing microservice. In various embodiments, the error management microservice 110(N) may direct the data processing microservice to reprocess the modified data file in the faulty data cache.

At decision block 720, the data processing platform 102 may determine whether the error is resolved. If the error is resolved ("yes" at decision block 720), the process may proceed to block 712. However, if the error is not resolved ("no" at decision block 720), the process 700 may loop back to block 714 so that the incoming sensor data may be further modified.

FIG. 8 illustrates a flow diagram of an example process 800 for providing notifications related to service-side remediation performed for incoming sensor data received from a data collection device. At block 802, the data processing platform 102 may detect that incoming sensor data from a data collection device caused an error at a data processing microservice of the data processing platform. At block 804, the data processing platform 102 may generate a status notification that includes a device identifier of the data processing device indicating that an error occurred during the processing of the incoming sensor data from the data collection device.

At block 806, the data processing platform 102 may provide the status notification that includes the device identifier for presentation via an application interface. In various embodiments, the status notification may be presented as a part of an administrative report by the management application interface 124 or as a part of a user report by the user application interface 128.

At block 808, the data processing platform 102 may determine a user identifier of a user assigned to the data collection device based at least on metadata embedded in the incoming sensor data. At block 810, the data processing platform 102 may provide the user identifier along with the device identifier in the status notification that is presented via the application interface. At block 812, the data processing platform 102 may determine that the error associated with the processing of the incoming sensor is resolved.

At block 814, the data processing platform 102 may generate a new status notification that includes at least one of the device identifier of the data collection device or the user identifier of the user, in which the status notification indicates that the error associated with the processing of the incoming sensor data is resolved. At block 816, the data processing platform 102 may provide the new status notification for presentation via the application interface. In various embodiments, the new status notification may be presented as a part of the administrative report by the management application interface 124 or as a part of the user report by the user application interface 128.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a data processing platform that includes a plurality of data processing microservices, the one or more non-transitory computer-readable media storing computer-executable instructions that upon execution cause one or more processors to perform acts comprising:

receiving incoming sensor data from a data collection device at the data processing platform, wherein the data processing platform includes the plurality of data processing microservices;

detecting that the incoming sensor data from the data collection device caused an error at a data processing microservice of the data processing platform;

queueing the incoming sensor data in a faulty data cache of the data processing platform;

modifying source code of at least one of the data processing microservice or the incoming sensor data stored in the faulty data cache such that the incoming sensor data is processed by the data processing microservice without the error; and deleting the incoming sensor data from the faulty data cache of the data processing platform.

2. The one or more non-transitory computer-readable media of claim 1, wherein the acts further comprise, following the detection of the error at the data processing microservice:

determining whether the error experienced by the data processing microservice caused a lock up of the data collection device; and in response to the determination that the error caused the lock up of the data collection device, directing the data collection device to resume a work operation state that frees up the data collection device to collect additional sensor data for uploading to the data processing platform.

3. The one or more non-transitory computer-readable media of claim 1, wherein the acts further comprise, following the detection of the error at the data processing microservice:

generating a data error event entry in a data error event queue documenting the error associated with the incoming sensor data; and removing the data error event entry in from the data error event queue following processing of the incoming sensor data without error by the data processing microservice of the data processing platform.

4. The one or more non-transitory computer-readable media of claim 1, wherein the acts further comprise:

generating a status notification that includes a device identifier of the data collection device, the status notification indicating that the error occurred during processing of the incoming sensor data from the data collection device; and providing the status notification that includes the device identifier for presentation via an application interface.

5. The one or more non-transitory computer-readable media of claim 4, wherein the acts further comprise:

determining a user identifier of a user assigned to the data collection device based at least on metadata embedded in the incoming sensor data; and providing the user identifier along with the device identifier in the status notification that is presented via the application interface.

6. The one or more non-transitory computer-readable media of claim 5, wherein the acts further comprising:

generating a new status notification that includes at least one of the device identifier of the data collection device or the user identifier of the user indicating that the error associated with the processing of the incoming sensor data is resolved; and providing the new status notification for the presentation via the application interface.

7. The one or more non-transitory computer-readable media of claim 4, wherein the status notification is included in an administrative report that is presented to an administrator of the data processing platform or a user report that is presented to an authorized user of the data processing platform.

8. The one or more non-transitory computer-readable media of claim 1, wherein the modifying the source code of the data processing microservice includes:

modifying the source code of the data processing microservice that experienced the error while processing the incoming sensor data; and reprocessing the incoming sensor data via the data processing microservice that includes the modified source code.

9. The one or more non-transitory computer-readable media of claim 1, wherein the modifying the incoming sensor data includes:

applying a modification to the incoming sensor data received from the data collection device and stored in the faulty data cache;

storing data regarding the modification of the incoming sensor data in a chain-of-custody ledger; and reprocessing the incoming sensor data that includes the modification via the data processing microservice.

10. The one or more non-transitory computer-readable media of claim 9, wherein the data regarding the modification as stored in the chain-of-custody ledger includes a first digital signature of a first data file that includes the incoming sensor data and a second digital signature of a second data file that includes modified incoming sensor data.

11. A system, comprising:
one or more processors; and
memory including a plurality of computer-executable components that are executable by the one or more processors to perform a plurality of actions, the plurality of actions comprising:
receiving incoming sensor data from a data collection device at a data processing platform, wherein the data processing platform includes a plurality of data processing microservices;
detecting, via an error management microservice of the data processing microservice, that the incoming sensor data from the data collection device caused an error at the data processing microservice;
queueing, via the error management microservice, the incoming sensor data in a faulty data cache of the data processing platform;
modifying, via the error management microservice, source code of at least one of the data processing microservice or the incoming sensor data stored in the faulty data cache such that the incoming sensor data is processed by the data processing microservice without the error; and
deleting, via the error management microservice, the incoming sensor data from the faulty data cache of the data processing platform.

12. The system of claim 11, wherein the actions further comprise, following the detection of the error at the data processing microservice:
determining whether the error experienced by the data processing microservice caused a lock up of the data collection device; and
in response to the determination that the error caused the lock up of the data collection device, directing the data collection device to resume a work operation state that frees up the data collection device to collect additional sensor data for uploading to the data processing platform.

13. The system of claim 11, wherein the actions further comprise, following the detection of the error at the data processing microservice:
generating a data error event entry in a data error event queue documenting the error associated with the incoming sensor data; and
removing the data error event entry in from the data error event queue following processing of the incoming sensor data without error by the data processing microservice of the data processing platform.

14. The system of claim 11, wherein the actions further comprise:
generating a status notification that includes a device identifier of the data collection device, the status notification indicating that the error occurred during processing of the incoming sensor data from the data collection device; and
providing the status notification that includes the device identifier for presentation via an application interface.

15. The system of claim 14, wherein the actions further comprise:
determining a user identifier of a user assigned to the data collection device based at least on metadata embedded in the incoming sensor data; and
providing the user identifier along with the device identifier in the status notification that is presented via the application interface.

16. The system of claim 14, wherein the status notification is included in an administrative report that is presented to an administrator of the data processing platform or a user report that is presented to an authorized user of the data processing platform.

17. A computer-implemented method, comprising:
receiving incoming sensor data from a data collection device at a data processing platform, wherein the data processing platform includes a plurality of data processing microservices;
detecting, via an error management microservice of the data processing microservice, that the incoming sensor data from the data collection device caused an error at the data processing microservice;
queueing, via the error management microservice, the incoming sensor data in a faulty data cache of the data processing platform;
modifying, via the error management microservice, source code of at least one of the data processing microservice or the incoming sensor data stored in the faulty data cache such that the incoming sensor data is processed by the data processing microservice without the error; and
deleting, via the error management microservice, the incoming sensor data from the faulty data cache of the data processing platform.

18. The computer-implemented method of claim 17, wherein the modifying the source code of the data processing microservice includes:
modifying the source code of the data processing microservice that experienced the error while processing the incoming sensor data; and
reprocessing the incoming sensor data via the data processing microservice that includes the modified source code.

19. The computer-implemented method of claim 17, wherein the modifying the incoming sensor data includes:
applying a modification to the incoming sensor data received from the data collection device and stored in the faulty data cache;
storing data regarding the modification of the incoming sensor data in a chain-of-custody ledger; and
reprocessing the incoming sensor data that includes the modification via the data processing microservice.

20. The computer-implemented method of claim 19, wherein the data regarding the modification as stored in the chain-of-custody ledger includes a first digital signature of a first data file that includes the incoming sensor data and a second digital signature of a second data file that includes modified incoming sensor data.

* * * * *